Patented Feb. 7, 1928.

1,658,606

UNITED STATES PATENT OFFICE.

LEON LILIENFELD, OF VIENNA, AUSTRIA.

CELLULOSE SOLUTION AND PROCESS FOR MAKING SAME.

No Drawing. Application filed June 18, 1923, Serial No. 646,239, and in Austria March 15, 1923.

It is known that cellulose and its near conversion products (including alkali cellulose, cellulose hydrates and hydrocelluloses) are insoluble in aqueous alkali solutions at normal room temperature, and that only by indirect methods was it heretofore possible to convert cellulose into bodies soluble in alkali.

The present invention relates to a process for the direct solution of cellulose or of its near conversion products in aqueous alkalies.

I have made the surprising discovery that cellulose or its derivatives or conversion products insoluble in aqueous alkalies or imperfectly or sparingly soluble therein, dissolve under certain conditions hereinafter more fully described, in aqueous alkalies at temperatures considerably below room temperature especially below 5° C. Temperatures below 0° C., for example temperatures between 0° C. and −25° C. or lower, have proved to be advantageous.

The dissolution proceeds with great rapidity and the solutions produced are clear and free from undissolved constituents. It is essential that in maintaining suitable operating conditions the dissolving power of the alkalies (without depolymerizing the cellulose), which appears only in the cold, should not be neutralized by higher temperatures, for instance room temperature; the cellulose solutions produced in the cold remain homogeneous and are very stable. The effect of low temperatures here described are certainly unexpected, because they are in contradiction with the general experience that low temperature reduces solubility and the particular experience that cold is wont to cause freezing and coagulation of colloids.

The fact that those bodies of the cellulose group hitherto considered to be insoluble in alkali solutions, may be dissolved directly in alkalies is not only of far-reaching theoretical import, but also signifies technical progress. This progress consists on the one hand in simplicity and economy in the preparation of the cellulose solutions, on the other hand in the circumstance that the dissolved cellulose or the dissolved near conversion product of cellulose may be separated again without any substantial chemical change and in technically valuable forms, so that the solutions and the products that may be manufactured therefrom are applicable to a variety of purposes.

The low temperatures at which dissolution occurs and the remarkable rapidity with which it proceeds guarantee an extensive conservation of the cellulose molecule.

My researches have furthermore shown, that the action of cold in presence of alkali is capable, in certain cases, of moderating, and in other cases of rendering of no effect, the consequences of an already accomplished disintegration of the cellulose molecule. This has been established incontestably in the case of cellulose conversion products soluble in alkali at room temperature, and particularly those obtained by separation from solutions of cellulose in mineral acids, zinc chloride or the like, by means of comparative experiments; the remarkable result was that while solutions prepared at room temperature directly from such cellulose conversion products, lead to technical products having little solidity when in the wet state and brittle when in the dry state (for example films), whereas their solutions prepared at a low temperature or prepared at room temperature and then cooled to low temperatures, yield products solid in the wet state and remarkably flexible in the dry state. The substantial improvement in their properties produced by the cold is retained in the solutions, or the dissolved substances, after their temperature has been raised to room temperature.

This compensation of the deleterious effects of degradation is of considerable technical significance in view of the otherwise valuable properties of such cellulose degradation products. But it also benefits such cellulose conversion products as are not degraded to the stage of complete solubility in alkali (for example products made by dissolving cellulose in mineral acids or zinc chloride or the like and separating at a suitable stage the body produced), but only to the stage of more or less incomplete solubility or of complete insolubility in alkalies. In this connection cold produces a dual effect: By causing the cellulose conversion products or their insoluble parts to dissolve, it removes the technical uselessness of these products which, apart from the expensive ammoniacal cupric oxids, could hitherto be worked up only in a state of solution in the solvent used for their solution, undergoing, however, a rapidly progressing decomposition in such solution. Moreover, the cold compensates the technically disastrous consequences of degradation and raises the properties of the products which can be made from such degradation products to the same level as those of the products obtainable from non-degraded or slightly degraded cellulose.

The result of the applicability of the present process to bodies of the cellulose group which are insoluble in alkalies at room temperature, or soluble with difficulty, or imperfectly soluble, or even soluble, is that the number of parent materials coming into consideration in the new process is a large one.

Hereinafter I give a description of the practical conduct of the process, but expressly remark that I do not intend limiting the scope of the invention to the details of this description.

As parent materials for the process the following may be named by way of example: (1) Bleached or unbleached cellulose of every kind and in every form in which it is available; (2) every kind of material containing cellulose (and especially materials containing large percentage of cellulose); (3) those conversion products which are formed by mechanical comminuting (for instance grinding or shreading) of cellulose in the presence of water i. e. hydrated cellulose; (4) cellulose conversion products or oxidation products which are obtained by treating cellulose or its conversion products insoluble in dilute caustic alkali solutions at room temperature, with oxidizing or reducing bleaching agents of every kind, irrespective of whether any preliminary treatment (for example with alkalies, acids, salts or the like) has or has not preceded the bleaching operation; (5) the conversion products which are obtained by heating cellulose by itself or in presence of water, or glycerine or the like, at normal, reduced or increased pressure; (6) the cellulose conversion products which are made by treating cellulose or its conversion products which are insoluble in dilute alkali solutions at room temperature, with alkali solution of various concentrations and, optionally, eliminating the surplus alkali solution by pressing, centrifugal action or the like (mercerizing the cellulose) with or without subsequent washing, with or without treatment with an acid, and with or without previous or subsequent or simultaneous treatment with bleaching or oxidizing agents; (7) those cellulose conversion products which are obtained by treating cellulose with hot alkalies in the presence or absence of salts; (8) the cellulose conversion products which are insoluble in dilute alkali solutions at room temperature, which are separated from complete or incomplete solutions of cellulose or of its soluble conversion products by suitable precipitating agents or other means and, if desired, purified by washing; for example from solutions or pastes of cellulose or cellulose hydrates or hydrocelluloses in ammoniacal cupric oxide or any other solvent containing copper as base, or from solutions or pastes of cellulose or cellulose hydrates or hydro-celluloses in zinc halides, for example zinc chloride, by itself or in presence of an acid or a salt, or from solutions or pastes of cellulose or cellulose hydrates or hydrocelluloses in strong mineral acids, such as sulphuric acid, phosphoric acid, hydrochloric acid, arsenic acid and the like alone or mixed with each other or in admixture with other inorganic or organic acids or acid salts, or from raw or purified viscose (cellulose xanthates) on its spontaneous decomposition or that caused by any other means; of all cellulose conversion products separated from cellulose solutions the statement holds good, that the nature of the separating agent is without influence on the present process; (9) threads and yarns of every description (such as artificial silk, artificial silk waste, artificial cotton, staple fibre or the like) made from cellulose composed of such conversion products or derivatives of cellulose as can be formed from viscose and like solutions by the usual setting process; (10) cellulose conversion products which are obtained by treating cellulose or its conversion products which are insoluble in dilute caustic alkali solutions at room temperature, (such as cellulose hydrates or hydro-celluloses), short of dissolution, with solvents such as strong mineral acids (for example strong sulphuric acid commonly used for parchmentizing) or zinc halides (for example zinc chloride or the like) or ammoniacal cupric oxide; (11) hydro-celluloses of every kind, such as are obtained, for example, by treating bleached or unbleached cellulose with dilute acids in the cold or at raised temperature under ordinary or increased pressure, or by drying in presence of acids, or by treating cellulose with strong sulphuric acid of below 50° Baumé in the cold, gaseous hydrochloric acid, or chlorine; (12) oxycelluloses of every kind; (13) the cellulose conversion products consisting of cellulose hydrates or hydrocelluloses obtainable from cellulose derivatives, such as esters or the like, by splitting the molecule or by saponification, such as, for example, denitrated cellulose nitrate, or saponified cellulose acetate or formate or the like.

The aforesaid conversion or oxidation products or derivatives of cellulose may be, in so far as their production process permits thereof, soluble in aqueous alkalies at room temperature or soluble with difficulty or imperfectly soluble or insoluble. They may be used in the dry, air-dry or moist or wet state. In the last two cases the percentage of water in the parent material must be taken into account when determining the strength and amount of the caustic alkali solution to be used intended for the solution. In the succeeding portion of this description and in the claims the expression "cellulosic body" is intended to include, wheresoever the meaning admits, all the materials enumerated in the foregoing paragraph. In the succeeding portion of this description and in the claims the expression: "cellulose conversion products" is intended to include all the materials enumerated in the foregoing paragraph under (4), (5), (6), (7), (8), (9), (10), (11) and (13) and the expression "mercerized cellulose" is intended to include all the materials enumerated in the foregoing paragraph under (6), (8) and (10) in so far as (8) and (10) relate to the treatment of cellulose with strong mineral acids, such as sulphuric acid.

The conduct of the process is very simple. It consists in mixing the parent material to be dissolved with the alkali solution and keeping the mixture (which, if a parent material wholly or partially soluble in alkali is being dealt with, may be a complete or incomplete solution or jelly or gelatinous mass) at a temperature suitable for dissolving, until solution occurs, or beyond this point.

The parent material may be mixed with the alkali solution at or above room temperature, for example at a raised temperature or at a temperature between room temperature and dissolving temperature, or even at dissolving temperature. In any case the parent material may be introduced into the alkali solution or vice versa.

If the parent material is mixed with the alkali solution at room temperature or another temperature above the dissolving temperature, then, if desired, the parent material may be impregnated uniformly with the alkali solution by stirring, kneading or rubbing, or by use of a vacuum, or pressure, or prolonged standing (for several hours or days, for instance) of the mixture. On the other hand there may be no mixing before the dissolving operation, that is, the cooling, begins, the parent material and alkali solution may be introduced in any desired sequence into the dissolving vessel and the cooling operation begun.

With regard to the strength of the alkali solution, I have found that cellulose (especially in the disintegrated state) under the action of low temperatures shows a tendency to dissolve in a caustic soda solution of even 2 per cent strength and is already in a very advanced state of dissolution in a caustic soda solution of 3 per cent strength, while in caustic soda solution of 16 per cent strength and over it still exhibits the characteristics of being dissolved. According to the present position of the process, alkali solutions corresponding with a caustic soda solution of under, say, 16 per cent, for example a caustic soda solution of from 4 to 10 per cent strength, may be indicated as preferable.

The dissolving operation may be carried out in a vessel which is adapted to be cooled externally or internally, or both externally and internally; it is preferably provided with a stirring or kneading device.

The temperature suitable for producing the most complete solution possible depends partly on the strength of the alkali solution and partly on the particular nature of the parent material. In this respect, according to the present state of the process, the following statements may be made:

With the same parent material the dissolving action of strong alkali solution occurs at higher temperatures than that of weak solutions.

With alkali solution of the same strength disintegrated cellulose dissolves at higher temperatures than slightly disintegrated or not disintegrated cellulose dissolves.

To illustrate the foregoing statements the following example may be adduced: Mercerized cellulose (produced, for example, by impregnating sulphite-cellulose with caustic soda solution of 18 per cent strength, eliminating the excess solution by pressing the product until it weighs twice or two-and-a-half times the weight of the cellulose comminuting, maturing for two to three days at room temperature, washing with water, optionally, treating with sulphuric acid of 5 to 10 per cent strength, and finally washing and drying) dissolves in caustic soda solution of 4 per cent strength only at −9° C. to −11° C. In caustic soda solution of 5 to 6 per cent strength the same parent material dissolves scarcely at all at −4° to −6° C. even on prolonged action at this temperature and with vigorous kneading or rubbing of the frozen mass; at −7° to −8° C. only after a long time; at −9° to −11° C. or lower, however, it dissolves rapidly and smoothly. Caustic soda solution of 8 per cent strength dissolves the mercerized cellulose at 0° C. scarcely at all; at −5° C. incompletely; at −8° to −9° C. rapidly and completely. In caustic soda lye of 10 per cent strength the same mercerized cellulose dissolves, although incompletely, even at 0° C. somewhat better at −2° C. and practically completely at −5° to −7° C.

With progressive degradation of the cellulose the temperatures at which dissolution occurs also rise. Thus, for example, the cellulose conversion products obtained by separation from cellulose solutions (for example in strong sulphuric acid or phosphoric acid or ammoniacal cupric oxide or from viscose—including, therefore, artifical silk or artificial silk waste from viscose) or strongly bleached, or bleached and mercerized celluloses, dissolve for example in caustic soda solution of 10 per cent strength—even though they are insoluble or not completely soluble therein at room temperature—at 0° C., and even at 0° to 5° C. the extent of dissolution is already remarkable.

The fact that at a certain temperature within the limits herein claimed a more or less complete solution has been produced, does not by itself afford a guarantee as to the full technical usefulness of such a solution. I have found that in many cases such solutions, in appearance already very clear and complete, when spread on a glass plate and treated with a precipitating bath, for example, dilute sulphuric acid, still yield a film which is hazy or has little tensile strength, or is hazy and also has little tensile strength, and that only on further cooling to still lower temperatures do such solutions become perfect in this direction, that is to say produce transparent and strong films The following comparative experiment illustrates this phenomenon, by way of example: Mercerized sulphite cellulose was dissolved in caustic soda solution of 10 per cent strength at −5° to −6° C. There was obtained a liquid, apparently perfect, solution, which, however, yielded in dilute sulphuric acid a hazy, extremely weak film. The same mercerized cellulose dissolved in cautic soda solution of 10 per cent strength at −9° to −11° C. yielded a solution which sarcely differed in appearance from that produced at −5° C., but yielded a transparent film resistant to tensile strain.

The exact knowledge of the above-discussed dependence of the solution temperature upon the strength of the alkali solution on the one hand, and the extent to which the cellulose is disintegrated on the other, is only of limited importance in the practical conduct of the operation, because my investigations have shown that the differences present at higher temperatures are more or less compensated as the temperature falls and that certain temperatures usually lead to the desired result in each case. By virtue of these investigations there may be stated a generalization as to the temperature, to which, however, the invention is not to be restricted, namely, that in nearly every case the desired result, that is a perfect solution yielding valuable technical products, is obtained in as short a time as possible at a temperature between −5° and −15° C., if not at a higher temperature. At temperatures below −8° to −9° C. the mixtures, particularly if the caustic alkali solution is very dilute (for example 6 per cent) and is vigorously stirred, usually begins to crystallize or to freeze. In using stronger alkali solutions (for example caustic soda solution of 10 to 12 per cent strength) the masses do not, indeed, freeze or crystallize quite so readily, but do so frequently at −9° to −12° C. and even while employing vigorous stirring. This phenomenon is in no wise detrimental to the quality of the final result. In very many cases it is even advisable to continue the action of the cold until freezing or crystallization occurs and to keep the mass in this state for a time.

Reduction of the temperature to below −12° to −15° C. is superfluous in most cases, but it entails no particularly deleterious consequences, especially when the content of cellulose in the solution is not too high and the duration of the action of the low temperature not too long.

Respecting the duration of the exposure to cold it may be assumed as a rule of guidance, to which, however, the invention is not to be confined, that the cooling operation may be ended as soon as, or shortly after a test portion shows that complete solution has occurred and that a small test film quickly prepared (for example by spreading the solution on a glass plate and treating with a suitable precpitating bath, for instance sulphuric acid of 10 to 20 per cent strength) exhibits the desired clearness and strength. If desired, the cooling may be continued for a longer time. In general, however, it is advisable not to prolong the period of cooling much beyond the moment in which complete solution occurs, because in such cases the risk is incurred that in consequence of too prolonged cooling the solution will acquire a gelatinous character or will become quite gelatinous or muddy.

It is advisable, during the cooling period to stir, or to knead or to keep the mass in movement, intermittently or continuously.

After completion of the dissolving operation in the cold, the cooling action is stopped, and the solution of the cellulosic body is worked up into technical products either cold—that is, at a temperature between dissolution temperature and room temperature—or preferably after being raised to room temperature.

The finished solutions can be precipitated or coagulated by salts, acids, alcohols, heat and the like. Their durability at room temperature varies according to their cellulose content, the strength of the alkali solution, the temperature during the cooling operation, but particularly the duration of this operation. As shown in the examples, many are very durable, especially those with a moderate content of cellulose and those in the preparation of which the low temperature has acted only for a short time; others solidify at room temperature sooner or later into reversible jellies (gels), others into irreversible jellies (gels) that is such as do not liquefy again in the cold. The first class mentioned is most valuable, the second class less valuable than the first, but still of considerable value, whereas the third class is still less valuable, and is suitable only for lower grade products. I prefer to form the first class mentioned viz, by stopping the cooling action early, so that when the mass is then promptly heated again up to about room temperature, the solution remains, without any gelatinization.

The finished solutions, either cold, just as they leave the process, or after they have been brought slowly or quickly to room temperature and, where necessary, after previous filtering or straining, may be used for the manufacture of technical products, such as artificial filaments and yarns (for example artificial silk, artificial cotton, staple fibre and the like), artificial hair, films of every kind, plastic masses, coatings of every kind on paper, textile fabrics, leather and the like, dressings and filling of fabrics, sizing of yarns, as book cloth, artifical leather and the like.

The solutions are easily worked up into technical products because they can readily be coagulated by suitable precipitating baths such as inorganic and organic acids, salts, alcohols, in some cases even water, or by heat, steam or the like.

The solutions may also be used for the purpose of obtaining in a solid, subdivided form of advantageous fineness the cellulose bodies dissolved therein, by precipitation with acids, salts, alcohols or the like, in many cases even water alone, or by heat or other suitable separating agent. Their physical and chemical properties render them valuable as a parent material for chemical processes, for example production of cellulose esters and the like.

As the cellulosic bodies before entering into solution pass through various plastic or gelatinous intermediate stages and as it is possible by interrupting the dissolving operation at the desired moment to obtain at once the desired form and state, it is to be noted that the invention comprises not only the production of the solutions, but also that of the more or less plastic jellies, pastry masses or gelatinous solutions, irrespective, moreover, of any undissolved parts that may be present, such as fibres, suspended particles or the like. These transition products are suitable for many technical purposes, for example dressing and filling of fabrics, making a substitute for parchment paper or for vulcanized fibre, and as binding agents and the like. The same applies to the jellies, gelatinous solutions and the like into which a complete solution may become converted, for instance, by being kept too long at low temperatures.

The following examples illustrate the invention, the parts being by weight:—

I.

(a) 10 parts of absorbent cotton or finely subdivided sulphite-cellulose are mixed with 190 to 240 parts of caustic soda solution of 8 to 10 per cent strength at room temperature, preferably while stirring or kneading, to produce a homogenous mass. The mixing or stirring may last only 10 to 15 minutes, particularly when the parent material readily takes up the caustic soda solution or is rapidly subdivided therein. The mixture may, however, be stirred for some hours or left at rest, so as to uniformly impregnate the parent material with the caustic soda solution. The mixture is then cooled and at the same time stirred, kneaded, shaken or otherwise agitated, in a vessel having an external or an internal (or both an external and an internal) cooling device adapted to reduce the temperature to that desired (for example the vessel may be surrounded by a freezing mixture at about $-15°$ to $-25°$ C., or by a double jacket which can be cooled with or without cooled mixing blades or a cooling worm or the like). When the temperature of the mass has fallen to $-9°$ to $-10°$ C., which starting from the beginning of the cooling operation occurs in about 8 to 10 minutes, the mass is slightly frozen and resembles thin lard in consistency and appearance. The expression "thin lard" as used herein is intended to denote a consistency resembling that of ordinary lard which is being heated up, when such lard is almost molten. Lard which is well iced is much harder (more consistent) than lard at normal room temperature, and as the temperature rises the hardness or consistency becomes successively lower, until just before actually melting, when it has a consistency denoted herein as "thin lard". Cooling is now interrupted and the temperature of the solution is quickly raised. This may be done, while stirring, either at room temperature or, in order to accelerate the process, while gently heating. At about $-5°$ to $-3°$ C. the solution is usually perfectly free from caustic soda crystals and therefore ready for use. It may be worked up into technical products either at this temperature or after its temperature has been raised to that of the room. It is usually practically free from undissolved constituents; should it still contain any it may be freed therefrom by filtering or centrifuging. When spread on a glass plate and treated with dilute sulphuric acid (for example of 10 to 20 per cent strength) the solution yields a transparent and flexible film. During a period of 14 days at room temperature no visible change is to be perceived in the solution.

(b) 10 parts of absorbent cotton or sulphite-cellulose are mixed with 240 parts of caustic soda solution of 6 per cent strength at room temperature until the mixture is homogeneous. The mixture is then cooled, while stirring, to −11° C. Even at −8° C. the mass usually shows distinct signs of incipient freezing. At −11° C. it usually thickens a good deal, but can still be stirred. After it has been kept 1 to 3 minutes at −10° to −11° C., the mass is caused to melt rapidly. At −5° to −3° C. it constitutes a solution, practically free from undissolved constituents, which may be worked up into technical products either at this temperature or at room temperature. If the solution is kept at −10° to −11° C. for a considerable time (say ½ hour to 1½ hours), it must be worked up at a low temperature because it gelatinizes at room temperature.

The sulphite-cellulose used in Examples I (a) and I (b) may be bleached before use, with a solution of chloride of lime or an electrolytic bleaching liquor or the like.

II.

10 parts of sulphite cellulose in fleece- or sheet-form are impregnated with 80 to 90 parts of caustic soda solution of 18 per cent strength, the impregnated mass is left for 24 hours and is then pressed until it weighs 20 parts and finally thoroughly ground or shredded or the like. The mass is then mixed either immediately or after it has matured for a short or long period (for example for 3 days), with 200 to 240 parts of caustic soda solution of 8 to 10 per cent strength so as to form a homogeneous mixture which is then cooled, while stirring, to −9° to −11° C. and kept at this temperature for about 1 minute. After thawing, the result is a solution practically free from undissolved constituents, which yields a transparent and flexible film. During 12 days at room temperature no visible indications of a change were seen in the solution.

III.

100 parts of sulphite-cellulose in fleece- or sheet-form are stirred with 1000 to 2000 parts of water to form a homogeneous mixture and after standing for several hours or several days at room temperature the mixture is pressed or centrifuged until it weighs 125 to 150 parts. The product is ground or comminuted for several hours up to 8 days in a suitable apparatus (for instance a shredder, a beater, a kneading machine or the like).

A quantity of this parent material corresponding with 10 parts of air-dry sulphite-cellulose is mixed with caustic soda-solution of suitable concentration so that the mixture contains 240 parts of caustic soda solution of 8 to 10 per cent strength to 10 parts of air-dry sulphite cellulose; it is then stirred to form a homogeneous mixture, which takes about 20 to 30 minutes. The mass is then cooled, while stirring, to −9° C., at which temperature it has the consistence and approximate appearance of thin lard. As soon as this temperature is attained (in about 8 to 10 minutes) cooling is interrupted and the solution thawed. At about −5° C. it is already liquid, constituting a solution practically free from undissolved constituents. It is worked up into technical products either at this temperature or after it has attained room temperature. The solution yields a transparent and flexible film. During 10 days at room temperature no visible change was detected in the solution.

IV.

100 parts of sulphite-cellulose in fleece- or sheet-form are impregnated with 800 to 1000 parts of caustic soda solution of 18 per cent strength and after standing for several hours (up to 24 hours) the mixture is reduced to 200 parts by pressing or centrifuging. The residue is then very finely comminuted and, either immediately afterwards or after short or long maturing (for instance for 3 days at room temperature) is washed free from alkali with cold or hot water, pressed or centrifuged to remove adherent water as far as possible and dried or used in the moist state. After the washing, however, the mercerized cellulose may receive a short treatment with a dilute acid (for example sulphuric acid of 5 to 10 per cent strength), then washed free from acid, pressed or centrifuged and either dried or used in the moist state. For the sake of simplicity, the rest of this example deals with the air-dry material.

(a) 10 parts of the air-dry mercerized cellulose are stirred or kneaded with 240 parts of caustic soda solution of 8 to 10 per cent strength until the mixture is homogeneous, and the mass is cooled to −9° to −10° C., which occupies about 10 to 15 minutes in all; at this temperature a complete solution permeated with crystals is obtained. Immediately the temperature of the mass has fallen to −9° to −10° C., the mass is thawed. At −5° to −3° C. the solution is already clear and practically free from undissolved constituents; it may be worked up into technical products either at this temperature or at room temperature. Spread on a glass plate and treated with dilute sulphuric acid, the solution yields a film which is solid and clear in the moist state and transparent and flexible in the dry state. After 3 weeks at room temperature no change is visible in the solution.

(b) The mode of operation is as in (a), with the difference that 150 to 190 parts of caustic soda solution of 8 to 10 per cent strength are used to 10 parts of air-dry mercerized cellulose.

(c) 10 parts of the air-dry mercerized cellulose as in (a) are stirred or kneaded with 240 parts of caustic soda solution of 5 to 8 per cent strength until the mixture is homogeneous. The mixture is then cooled, while stirring, to −10° to −11° C., which occupies about 8 to 10 minutes. At −7° to −8° C. the mass has already begun to freeze, which phenomenon is intensified at −10° C. As soon as it has cooled to −10° to −11° C., the mass is thawed. Already at −5° to −3° C. it constitutes a clear solution, practically free from undissolved constituents, which may be worked up into technical products either at this temperature or at room temperature. The solution yields a film which is clear and solid in the wet state and transparent and flexible in the dry.

(d) The mode of operation is as in IV (c) with the difference that the mass is cooled down to −11° C. and is kept at this temperature, while stirring, for 15 to 30 minutes.

This difference affects the result, in that the solution gelatinizes if brought to room temperature. It liquefies, however, if it is cooled again to about −5° C. Accordingly, it must be worked up at temperatures below room temperature, for example at −3° to −5° C.

(e) The mode of operation is as in IV (c), with the difference that the mass is rapidly cooled to −18° to −24° C. The result is about the same.

(f) 190 to 240 parts of caustic soda solution of 8 to 10 per cent strength are cooled to −15° C., whereupon it crystallizes slightly. Into this solution 10 parts of air-dry mercerized cellulose, as in IV (a) are introduced and rapidly kneaded, solution occurring in a very short time. The solidified mass resembling thin lard is thawed, whereby it is converted into a solution practically free from undissolved constituents, which yields a transparent and flexible film.

The mercerized cellulose used in Examples IV (a)−IV (f), may be bleached before or after mercerizing with bleaching agents such as chloride of lime solution or an electrolytic bleaching liquor, or sodium peroxide or the like. It is also possible to add to the caustic soda solution used for the mercerizing operation sodium peroxide of about 1 per cent strength, in which case the mercerizing operation is reduced to a few hours and the maturing of the disintegrated cellulose dispensed with altogether, that is to say the mercerized cellulose is to be washed immediately after the comminuting operation.

V.

100 parts of finely subdivided sulphite-cellulose are introduced in small portions into 1000 to 2000 parts of sulphuric acid of 60° Baumé specific gravity cooled to −12° C., while kneading, rubbing or mixing and continuously cooling. The introduction takes about 20 minutes. The temperature of the mass during the introduction is kept at about −10° to −11° C. After the whole of the sulphite-cellulose is incorporated in the sulphuric acid, the product is a very tough dough, which may be rolled out on a glass plate and, in a thin layer, appears to be transparent. This dough is continuously cooled to −10° to −12° C., while kneading for another ½ to 1 hour, and is then kneaded with ice water or dilute sulphuric acid, added in small portions, until it is completely precipitated. The precipitated product is washed with water (if desired, after previous pressing for the purpose of recovering the sulphuric acid) until sulphuric acid can no longer be detected in the washing water and a test portion of the body even when boiled with water yields no sulphuric acid to the water. To accelerate the washing operation the more or less coarse product may be triturated or ground once or several times in the wet state. The washed product is now pressed or centrifuged, if necessary again triturated or ground, and then dissolved according to the present process either in the wet state or after having been dried in a vacuum or in the air. If the body is used in the wet state, the water content must previously be determined.

(a) A quantity of the above-described parent material corresponding with 10 parts by weight of the dry residue is mixed with caustic soda solution of suitable concentration so that the mixture contains 190 parts of caustic soda solution of 8 to 10 per cent strength to 10 parts of the dry residue. After stirring for about 10 to 15 minutes at room temperature the cellulose body swells to a vitreous form. Spread upon a glass plate and treated with dilute sulphuric acid the swollen mass yields no coherent film, but a skin which is broken up when rubbed or pulled. The mixture is then cooled while stirring. As soon as its temperature has fallen to about 1° C., there is present an almost perfect solution, which becomes perfect at −3° C. and even at this temperature yields a perfectly clear and solid film. The solution is cooled to −4° C. (which takes about 10 minutes in all) and kept at this temperature for 10 minutes. There is produced a perfectly clear viscous, but easily flowing solution practically free from undissolved constituents, which yields a film clear and firm in the wet state, and transparent and flexible when dry. During 14 days at room temperature no visible signs of a change were detected in the solution.

(b) The mode of operation is as in (a) with the difference that the solution is cooled to −8° C. and kept for 1 minute at this temperature, at which the solution is permeated with crystals and resembles a thin lard. The result does not differ substantially from that produced in V (a). In this case also the product is a clear solution practically free from undissolved constituents, yielding perfect films and approximately as durable as the solution obtained in V (a).

(c) A quantity of the above described parent material corresponding with 10 parts of the dry residue is mixed with caustic soda solution of suitable concentration so that the mixture contains 190 parts of caustic soda solution of 6 per cent strength to 10 parts of dry residue. The mass is then cooled to −9° to −10° C. and kept at this temperature for 20 to 30 minutes. Hereby it freezes slightly to form a mass resembling a thin lard, but capable of being stirred, which after thawing becomes at about −5° to −3° C. a perfectly clear solution practically free from undissolved constituents. This solution yields a film which is clear and firm while wet and transparent and flexible when dry. Brought to room temperature it solidifies to a clear jelly which, however, liquefies completely when cooled to about −5° C. and again yields a perfect film. Even if the jelly is left standing for several days at room temperature, it is still soluble and technically useful when cooled to −5° C.

(d) The mode of operation is as in (c), with the difference that the mass is kept only 1 to 2 minutes at −9° C. The result differs from that described in (c) only in that the solution does not gelatinize at room temperature and, accordingly, may be worked up at that temperature.

VI.

100 parts of finely subdivided sulphite-cellulose are introduced in small portions, while continuously kneading, into 340 parts of sulphuric acid of 60° Baumé specific gravity cooled to −11° C. The introduction of the entire quantity of cellulose occupies about 13 minutes. At the same time the temperature may rise to 3° C. The very tough dough produced permeated with masses consisting of unchanged cellulose, is still kneaded, while continuously cooling, for about 30 minutes, in such a manner that the temperature during the kneading operation fluctuates between −1° C. and 2° C. After this period, ice water or dilute sulphuric acid is kneaded in small portions into the hard dough, whereby it precipitates and crumbles into very rigid small lumps and skins. The precipitated product (if desired after previous pressing to recover the sulphuric acid) is washed with water until sulphuric acid can be no longer be detected in the washing water and a test portion even when boiled with water does not yield sulphuric acid to the water. In order to accelerate the washing operation, the more or less coarse product may be triturated or ground once or several times in the moist state during the washing operation. The washed body is now pressed or centrifuged, if necessary again triturated or ground and then dried in a vacuum over sulphuric acid at room temperature and again comminuted.

10 parts of the dry body (analysis showed a water content of about 8 to 12 per cent) are stirred or kneaded with 190 parts of caustic soda lye of 8 to 10 per cent strength for 10 to 15 minutes; a swollen, dense, pasty mass is produced. The mixture is then cooled to −11° C., which occupies 10 to 15 minutes, and is kept at this temperature for 1 to 3 minutes. It is thus solidified to form a mass resembling thin lard. After thawing, there is produced a clear solution practically free from undissolved constituents which yields a film clear and firm while wet and transparent and flexible when dry. During 14 days at room temperature no visible signs of a change were detected in the solution.

VII.

100 parts of finely subdivided sulphite-cellulose are introduced quickly, while continuously kneading, into 500 parts of sulphuric acid of 60° Baumé gravity, cooled to −5° to −6° C.; this operation occupies about 8 to 10 minutes. During this time the temperature may rise to 6° C. and only parts of the cellulose are dissolved or formed into dough. Then, while suitably cooling, the mass is kneaded for 35 minutes at 4° to 5° C. and the dough produced, which still contains a few small particles of unchanged cellulose, is kneaded with ice water or dilute sulphuric acid, added by portions. The mass precipitated in shreds and small lumps is washed with water (if desired after previous pressing for the purpose of recovering the sulphuric acid) until the sulphuric acid can no longer be detected in the water and a test portion even when boiled with water no longer yields sulphuric acid to the water. To accelerate the washing operation, the more or less coarse product may be triturated or ground once or several times in the moist state during the washing. The washed product is now pressed or centrifuged, if necessary again triturated or ground and is then either dissolved in the wet state according to the invention, or previously dried in a vacuum or in the air. If the body is used in the wet state, the water-content must previously be determined.

A quantity of the above-described product corresponding with 10 parts of the dry residue, is mixed with caustic soda lye of suitable concentration so that the mixture contains 10 parts of dry substance and 190 parts of caustic soda solution of 8 to 10 per cent strength, and the mixture is stirred until homogeneous. At the same time, the body passes into solution, with the exception of very small portions. Spread on a glass plate and treated with dilute sulphuric acid, the clear solution yields a film, clear, certainly, but with very little strength while wet and brittle when dry. The solution is now cooled, while stirring, to −8° C., which occupies about 10 to 15 minutes. It solidifies to a mass having the appearance of a thin lard, which after thawing at about −5° C. to −3° C. becomes a clear solution practically free from undissolved constituents, which yields a film clear and firm while wet, transparent and very flexible when dry. By way of illustration it may be remarked that a dry film prepared from the non-cooled solution and having a thickness of 0.4 mm. breaks even on being bent, whereas the film prepared from the cooled solution, dried in the same time and manner, and of the same thickness, may be bent 10 to 15 times without breaking. The solution was found to keep at room temperature for four weeks without showing visible signs of a change.

VIII.

Into 1000 to 2000 parts of sulphuric acid of 45° to 50° Baumé gravity, cooled to −5° C. 100 parts of sulphite-cellulose are quickly introduced and kneaded for come minutes but only to such an extent that no solution occurs; this occupies about 3 to 5 minutes. The swollen mass is then kneaded with ice-water and washed with water until sulphuric acid can no longer be detected in the washing water and until a test portion even boiled with water yields no more sulphuric acid to the water. The washed body is now pressed or centrifuged and dissolved either in the wet state according to the present invention, or after it has been dried in a vacuum or in the air. If the body is used in the wet state, the water-content must previously be determined.

A quantity of the above-described body corresponding with 10 parts by weight of dry residue is mixed with caustic soda solution of suitable concentration so that the mixture contains 10 parts of dry substance and 190 parts of caustic soda solution of 8 per cent strength. There occurs no dissolution, but merely swelling. The mixture is cooled, while stirring, to −8° to −9° C., which occupies about 8 to 15 minutes. By thawing there is produced a clear solution practically free from undissolved constituents which yields a film clear and strong while wet and transparent and flexible when dry.

In Examples V–VIII there may be used instead of sulphuric acid, another mineral acid such as hydrochloric acid or phosphoric acid. If, for instance, phosphoric acid of specific gravity 1.85 is used, it is advisable not to cool, but to carry out the kneading operation at room temperature and to continue it until a homogeneous dough free from undissolved constituents is produced.

IX.

A crude viscose is prepared by impregnating cellulose with caustic soda solution of 15 to 18 per cent strength, pressing until the mass has 2 to 3½ times the weight of the cellulose, comminuting, maturing for about 3 days at room temperature, treating with carbon bisulphide amounting to one-tenth to one-half of the weight of the cellulose, dissolving in water or dilute caustic soda solution and, if desired, leaving it to stand for 3 to 4 days at 10° C. This crude viscose is diluted with water in such a manner that there is produced a solution of 2 per cent strength calculated on the weight of the sulphite-cellulose used for producing the sodium cellulose, and this solution is mixed, while vigorously stirring, with dilute sulphuric acid (for example of 5 to 10 per cent strength) in small portions, until nothing more is precipitated. The precipitate is filtered or centrifuged, washed with water until the washings are free from sulphuric acid, and pressed or centrifuged.

A quantity of this parent material (which contains a substantial percentage of water) corresponding with 10 parts of dry matter, is mixed with caustic soda solution of suitable concentration so that the mixture contains 190 parts of caustic soda solution of 8 to 10 per cent strength to 10 parts of dry cellulosic substance. Thereupon only a part of the moist precipitate passes into solution. The mass is now cooled to −9° to −11° C., which occupies about 6 to 10 minutes, whereby it solidifies to a mass recalling thin lard. By thawing there is produced a clear solution practically free from undissolved constituents which yields a film, clear and strong while wet and transparent and flexible when dry. During 14 days no visible signs of a change are to be detected in the solution.

X.

100 parts of sulphite-cellulose are saturated with 800 to 1000 parts of caustic soda solution of 15 to 18 per cent strength; the mixture is pressed after 6 to 24 hours until it weighs 250 to 360 parts, shredded for 2 to 3 hours, and the product matured for 3 days at room temperature. The mass is then treated in the usual manner with 50 parts by weight of carbon bisulphide for some hours. After this time, the mass is kneaded, without dissolving it, with sulphuric acid of 5 per cent strength, which is added by portions, until the mass shows acid reaction and breaks up into shreds resembling cabbage. 1000 to 1500 parts by weight of sulphuric acid of 5 per cent strength are usually sufficient. The mass is now filtered or centrifuged, washed with water until the washings are free from sulphuric acid and then pressed or centrifuged.

A quantity of the above-described body corresponding with 10 parts by weight of the dry residue is mixed with caustic soda solution of suitable concentration so that the mixture contains 190 parts of caustic soda solution of 8 to 10 per cent strength to 10 parts of dry substance. The mixture is stirred at room temperature until homogeneous, whereby no solution occurs, but merely swelling. The mixture is then cooled, while stirring, to $-9°$ to $-11°$ C., whereby it solidifies to a mass like thin lard. After being kept at this temperature for 1 to 2 minutes, it is thawed. There is produced a clear solution practically free from undissolved constituents, which yields a film clear and strong while wet and transparent and flexible when dry.

XI.

80 to 100 parts of sulphite-cellulose in fleece- or sheet-form are stirred with 920 to 900 parts of caustic soda solution of 6 to 8 per cent strength until homogeneous. There are added 10 to 30 parts of carbon bisulphide and the mixture is stirred, kneaded or shaken or otherwise agitated in a closed vessel for 4 to 10 hours. The mass is then mixed, while stirring, with sulphuric acid of 5 to 10 per cent strength until the reaction is acid, and the solid residue is separated from the mother liquor by straining or the like. It is washed with water until the washings are free from sulphuric acid and is then pressed or centrifuged.

The pressed or centrifuged residue is now mixed with caustic soda solution of suitable concentration, so that the mixture contains 190 to 130 parts of caustic soda solution of 6 to 10 per cent strength to 10 parts of dry parent material, whereupon it is stirred until homogeneous. The mixture is now cooled to $-9°$ to $-11°$ C. and kept at this temperature for 1 to 3 minutes. The solution, more or less frozen according to the concentration of the caustic soda solution, is thawed; it is then clear and practically free from undissolved constituents and yields a film clear and strong while wet, and transparent and flexible when dry.

In the foregoing Examples IX–XI the viscose may be decomposed by heat equally as well as by sulphuric acid; for example the viscose may be boiled for several hours with water; or by an acid other than sulphuric acid; or by standing.

XII.

(a) 10 parts of bleached or unbleached viscose silk, or viscose silk waste, are mixed with 115 to 190 parts of caustic soda solution of 8 per cent strength, whereby the artifical silk only swells but does not dissolve. It is suspended in the caustic soda solution in the form of a swollen lump. The mixture is now cooled, while stirring, to $-9°$ to $-11°$ C. which occupies about 10 to 15 minutes.

The mixture is then thawed, when it forms a mass like thin lard. There is produced a solution practically free from undissolved constituents, which yields a film clear and strong while wet and transparent and flexible when dry. During 14 days at room temperature no visible signs of a change are to be detected in the solution.

(b) The mode of operation is as in (a), with the difference that instead of viscose silk, ammoniacal cupric oxide silk is used. The result is the same on the whole.

Even caustic soda solution of 10 per cent strength at room temperature does not dissolve artificial silk. Swelling occurs but the swollen mass does not yield a film, but only a residue which breaks down when stretched or rubbed. Only on cooling does dissolution occur.

The solutions described in the examples, immediately after their production or after short or prolonged standing, may be worked up into artificial threads, for example artificial silk, staple fibre, artificial hair or the like, by passing the solutions through fine openings and coagulating the thread thereby formed by suitable precipitating baths, for example dilute acids, salt solutions or the like.

I claim:

1. A process of making cellulose solutions by treating a cellulosic body with an aqueous alkali solution at temperatures below 5° C., and continuing the low temperature action only for such a length of time that while the major part at least of the cellulosic body dissolves, the solution obtained will not substantially gelatinize when brought to room temperature or will upon re-cooling form a reversible gel.

2. A process of making cellulose solutions by treating a cellulosic body with an aqueous caustic alkali solution at temperatures below 5° C., and continuing the low temperature only for such a length of time that while the major part at least of the cellulosic body dissolves, the solution obtained will not permanently gelatinize when brought to room temperature, the caustic alkali solution being not stronger during the low temperature step, than about 10%.

3. A process of making cellulose solutions by treating a cellulosic body as herein defined with an aqueous alkali solution at temperatures below 0° C., and continuing the low temperature action only for such a length of time that the major part at least of the cellulosic body dissolves and the solution obtained will not substantially gelatinize when brought to room temperature or will upon re-cooling form a reversible gel.

4. A process of making cellulose solutions by treating a cellulosic body as herein defined with an aqueous alkali solution at temperatures below −8° C., and continuing the low temperature action only for such a length of time that the solution obtained will not substantially gelatinize when brought to room temperature or will upon re-cooling form a reversible gel.

5. A process of making cellulose solutions by treating a cellulosic body as herein defined with an aqueous alkali solution at temperatures below 5° C., and continuing the low temperature only for such a length of time that while the bulk of the cellulosic material dissolves, the solution obtained will not substantially gelatinize when brought to room temperature, but will remain for several days in a state suitable for being worked up or will upon re-cooling form a reversible gel.

6. A process of making cellulose solutions according to claim 3, characterized in that the alkaline solution is initially mixed with the cellulosic body at room temperature, after which the mixture is cooled.

7. A process of making cellulose solutions by treating a cellulose conversion product which is insoluble in dilute caustic alkalies at room temperature, with an aqueous alkali solution at temperatures below 5° C., and continuing the low temperature action only for such a length of time that the cellulosic body dissolves and the solution obtained will not substantially gelatinize when brought to room temperature or will upon re-cooling form a reversible gel.

8. A process of making cellulose solutions by treating a cellulose conversion product which is insoluble in dilute caustic alkalies at room temperature, with an aqueous caustic alkali solution at temperatures below 5° C., and continuing the low temperature only for such a length of time that the solution obtained will not permanently gelatinize when brought to room temperature, the caustic alkali solution being not stronger during the low temperature step, than about 10%.

9. A process of making cellulose solutions by treating a cellulose conversion product which is insoluble in in dilute caustic alkalies at room temperature, with an aqueous alkali solution at temperatures below 0° C., and continuing the low temperature action only for such a length of time that the cellulosic body dissolves and the solution obtained will not substantially gelatinize when brought to room temperature or will upon re-cooling form a reversible gel.

10. A process of making cellulose solutions by treating a cellulose conversion product which is insoluble in dilute caustic alkalies at room temperature, with an aqueous alkali solution at temperatures below minus 8° C., and continuing the low temperature action only for such a length of time that the major part at least of the cellulose conversion product dissolves but the solution obtained will not substantially gelatinize when brought to room temperature or will upon re-cooling form a reversible gel.

11. A process of making cellulose solutions by treating a cellulose conversion product which is insoluble in dilute caustic alkalies at room temperature, with an aqueous alkali solution at temperatures below 5° C., and continuing the low temperature only for such a length of time that the major part at least of the cellulose conversion product dissolves but the solution obtained will not substantially gelatinize when brought to room temperature, but will remain for several days in a state suitable for being worked up or will upon re-cooling form a reversible gel.

12. A process of making cellulose solutions by treating a cellulose conversion product obtained by acting with a mercerizing agent upon a cellulosic body with an aqueous alkali solution at temperatures below 5° C., and continuing the low temperature action only for such a length of time that the cellulosic body dissolves and the solution obtained will not substantially gelatinize when brought to room temperature or will upon re-cooling form a reversible gel.

13. A process of making cellulose solutions by treating a cellulose conversion product obtained by acting with a mercerizing agent upon a body of the cellulose group, with an aqueous caustic alkali solution at temperatures below 5° C., and continuing the low temperature only for such a length of time that the major part at least of the cellulose conversion product dissolves, but the solution obtained will not permanently gelatinize when brought to room temperature, the caustic alkali solution being not stronger during the low temperature step, than about 10%.

14. A process of making cellulose solutions by treating a cellulose conversion product obtained by acting with a mercerizing agent upon a cellulosic body, with an aqueous alkali solution at temperatures below 0° C., and continuing the low temperature action only for such a length of time that the cellulosic body dissolves and the solution obtained will not substantially gelatinize when brought to room temperature or will upon re-cooling form a reversible gel.

15. A process of making cellulose solutions by treating a cellulose conversion product obtained by acting with a mercerizing agent upon a cellulosic body, with an aqueous alkali solution at temperatures below $-8°$ C., and continuing the low temperature action only for such a length of time that the solution obtained will not substantially gelatinize when brought to room temperature or will upon re-cooling form a reversible gel.

16. A process of making cellulose solutions by acting with a mercerizing agent upon a cellulosic body of the cellulose group, and then treating the mercerized material with an aqueous alkali solution at temperatures below 5° C., and continuing the low temperature only for such a length of time that although the cellulosic body dissolves in the alkali solution the solution obtained will not substantially gelatinize when brought to room temperature, but will remain for several days in a state suitable for being worked up or will upon re-cooling form a reversible gel.

17. A process of making cellulose solutions by acting with an alkaline mercerizing agent upon a body of the cellulose group to mercerize the same, then reacting thereupon with an aqueous alkali solution at temperature below 5° C., and continuing the low temperature action only for such a length of time that the cellulosic body dissolves and the solution obtained will not substantially gelatinize when brought to room temperature or will upon re-cooling form a reversible gel.

18. As new products, solutions of cellulosic bodies which consist practically only of a sulphur-free body of the cellulose group, alkali and water and which solutions yield flexible films.

19. As new products, solutions of cellulosic bodies which do not substantially gelatinize at room temperature and which practically consist only of a sulphur-free body of the cellulose group, alkali and water and which solutions yield flexible films.

20. As new products, solutions of cellulosic bodies which practically consist only of a sulphur-free body of the cellulose group, alkali and water and which on being acidified yield precipitates that at room temperature are practically insoluble in aqueous alkali solutions.

21. As new products, solutions of cellulosic bodies which do not substantially gelatinize at room temperature and which practically consist only of a sulphur-free body of the cellulose group, alkali and water and which on being acidified yield precipitates that at room temperature are practically insoluble in aqueous alkali solutions.

22. As new products, solutions of bodies of the cellulose group which contain a body of the cellulose group, alkali and water but no carbon bisulphide residues and no compounds of copper having a dissolving action on cellulose, which solutions without an addition of a softening agent, yield flexible films.

23. As new products, solutions of cellulosic bodies which contain a body of the cellulose group, alkali and water but no carbon bisulphide residues and no compounds of copper having a dissolving action on cellulose, which solutions, on being acidified, yield precipitates that at room temperature are practically insoluble in aqueous alkali solutions.

24. As new products, solutions of cellulosic bodies which do not substantially gelatinize at room temperature and which contain a body of the cellulose group, alkali and water but no carbon bisulphide residues and no compounds of copper having a dissolving action on cellulose, which solutions without an addition of a softening agent, yield flexible films.

25. As new products, solutions of cellulosic bodies which do not substantially gelatinize at room temperature and which contain a body of the cellulose group, alkali and water but no carbon bisulphide residues and no compounds of copper having a dissolving action on cellulose, which solutions, on being acidified yield precipitates that at room temperature are practically insoluble in aqueous alkali solutions.

In testimony whereof I affix my signature.

LEON LILIENFELD.